US 6,697,569 B1

(12) United States Patent
Gomez et al.

(10) Patent No.: US 6,697,569 B1
(45) Date of Patent: Feb. 24, 2004

(54) AUTOMATED CONVERSION OF A VISUAL PRESENTATION INTO DIGITAL DATA FORMAT

(75) Inventors: Peter Gomez, Stockholm (SE); Göthe Lindahl, Umeå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/326,410

(22) Filed: Jun. 4, 1999

Related U.S. Application Data

(60) Provisional application No. 60/099,951, filed on Sep. 11, 1998.

(51) Int. Cl.⁷ .............................................. H04N 5/91
(52) U.S. Cl. ........................ 386/120; 386/65; 386/112
(58) Field of Search ........................... 386/46, 95, 120, 386/121, 52, 65, 111, 112; 358/906, 909.1; 348/14.07, 14.08, 14.09, 461

(56) References Cited

U.S. PATENT DOCUMENTS

| | | | |
|---|---|---|---|
| 5,331,345 A | | 7/1994 | Akimoto et al. ............ 348/297 |
| 5,742,329 A | | 4/1998 | Masunaga et al. ............ 348/15 |
| 5,745,161 A | * | 4/1998 | Ito ............................ 348/14.09 |
| 5,751,445 A | | 5/1998 | Masunaga ................. 348/426 |
| 6,426,778 B1 | * | 7/2002 | Valdez, Jr. ................. 348/461 |

FOREIGN PATENT DOCUMENTS

| | | |
|---|---|---|
| GB | 2 282 506 A | 4/1995 |
| GB | 2 306 274 A | 4/1997 |
| JP | 09163276 A | 6/1997 |
| JP | 10191294 | 7/1998 |
| JP | 10257463 | 9/1998 |

OTHER PUBLICATIONS

Zhang and Kittler, *Using Background Memory for Efficient Video Coding*, Centre for Vision, Speech and Signal Processing, School of EEIT&M, University of Surrey, United Kingdom, 1998 IEEE.

Zhang and Kittler, *Global Motion Estimation and Robust Regression for Video Coding*, Centre for Vision, Speech and Signal Processing, School of EEIT&M, University of Surrey, United Kingdom, 1998 IEEE.

* cited by examiner

*Primary Examiner*—Huy Nguyen

(57) ABSTRACT

A full multimedia production such as a seminar, conference, lecture, etc. can be captured in real time using multiple cameras. A live movie of a speaker together with the speaker's flipping still images or slide show can be viewed interactively within the same video display screen. The complete production can be stored on a hard drive for retrieval on demand, or sent live to a host server for live distribution throughout a data network. It is also possible to store the complete presentation on portable storage media and/or to send the complete presentation as an e-mail.

9 Claims, 15 Drawing Sheets

AUTOMATED CONVERSION OF A VISUAL PRESENTATION INTO DIGITAL DATA FORMAT

This application claims the priority under 35 USC 119 (e)(1) of copending U.S. Provisional Application No. 60/099,951, filed on Sep. 11, 1998.

FIELD OF THE INVENTION

The invention relates generally to streaming video through a data network and, more particularly, to integrating still images into a stream of live, moving images.

BACKGROUND OF THE INVENTION

Many companies and education institutes have tried to use the Internet for distributing documentation of seminars, meetings, lectures, etc. including video. Those who have tried know that one problem is the cost for the video post-production, and that it is impossible to be able to send the material on the Internet when it is fresh and has high actuality. One day of normal video production of a seminar may cost $25,000–$37,500. The production is typically accessible on the Internet from one week to fourteen days after the event. Experts are typically engaged that know about filming, digitization and encoding. An expert in creating Web pages is also usually needed.

A first problem in producing multimedia for the Internet is the large amount of tools a user has to manage. A second big issue is that it is time consuming. One hour of video takes about one hour to encode. A third problem is that if the user wants to have synchronized flipping images (from e.g., an overhead-projector etc.) there is a lot of work finding the synchronization points and creating the control files. A fourth problem is that the use of several cameras requires several camera operators.

Around the presentation or seminar there has to be at least one camera operator and often one person responsible for the sound and taking still pictures, with a digital still picture camera, of drawings at, for example, a whiteboard, notepad or overhead. A stopwatch is used to keep records of all still pictures when they are presented, because it is not always possible to figure out, from after-the-fact viewing of the movie of the speaker, what pictures to show as JPEG. Powerpoint slideshows etc., and other computer-based presentations are often sent as e-mail the day after the presentation, for conversion to JPEG or other suitable format by the production staff. It is, of course, possible to take stills at the same time as the pictures are presented, which is done when external presenters hold presentations.

The Powerpoint slides, when they arrive by e-mail, are (as mentioned above) converted to JPEG by the streaming production staff. The slides are also resized to fit in an HTML page together with the video window.

The production of streaming videos for 28.8K, 56K and 100K bit rates needs an extra window for the real information shown on slides, etc., because the video window is very small and the information in it is unreadable.

The video film is often manually edited with software like Adobe Premier. After editing, if any, the encoder is used to compress the video and audio to the correct baud-rate, and encode them to a streaming format like ASF (Active Streaming Format) or RMFF (Real Media File Format). The encoding takes the same amount of time as it takes to run through the movie. This is time consuming.

To be able to show the JPEG images (e.g. slide show) at the right time (compared to the movie events), synchronization points (time stamps) must be inserted in the stream file. In both Real Networks products and in Microsoft Netshow there are utilities available to do this. This typically requires an expert, even though the aforementioned tools have good user interfaces.

After all this has been accomplished, it is time to create HTML pages and frames. There has to be an HTML page for each picture.

It is therefore desirable in view of the foregoing to provide for distributing a visual presentation using Internet or another data network, without the aforementioned disadvantages of the prior art.

Embodiments of the present invention offer the ability to capture a full multimedia production such as a seminar, conference, lecture, etc. in real time using multiple cameras. A live movie of the speaker together with the speaker's flipping still images or slide show can be viewed interactively within the same video display screen. The complete production can be stored on a hard drive or sent live to a host server. The information can be retrieved on demand or distributed live throughout a data network such as the Internet or corporate Intranet. It is also possible to store the complete presentation on CD or other portable storage media, and/or to send it as an e-mail to a PC.

According to the principles of the invention, the tools are handled automatically in the background, shielded from the user, and the encoding is done in real-time. The synchronization points are set when the event is really happening. In one example, overhead-projector plastic slides, computer VGA-graphics, whiteboard drawings, etc. are captured and converted to JPEG, and the video encoding is done in MPEG and stored together with the sound and synchronization points in an ASF file for RTSP (Real Time Streaming Protocol; see RFC 2326 published by IETF (www.IETF.org)) streaming.

BRIEF DESCRIPTION OF THE DRAWINGS

The disclosed invention will be described with reference to the accompanying drawings, which show important sample embodiments of the invention, wherein.

DETAILED DESCRIPTION

Figure 1:
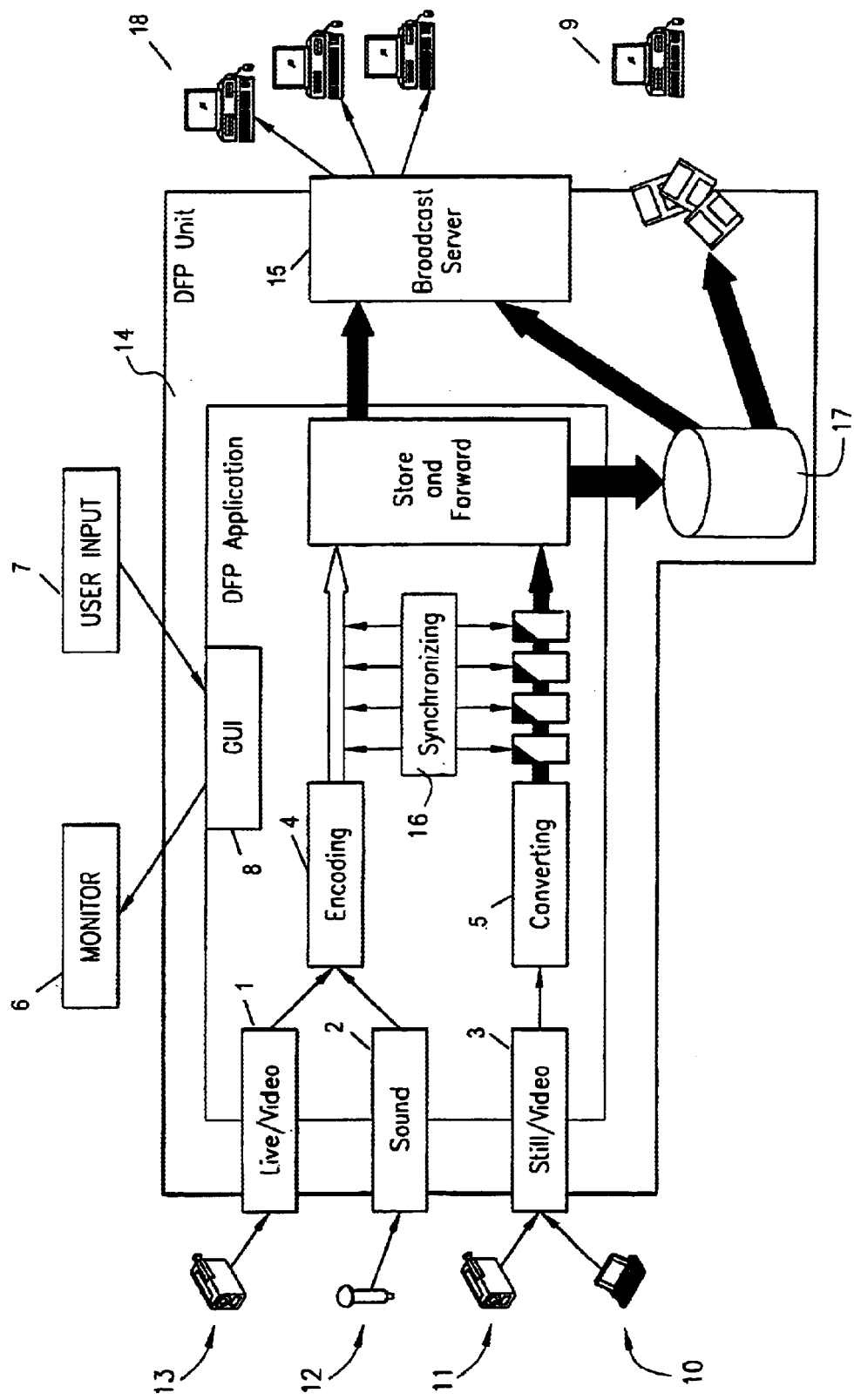
FIG. 1 illustrates one example system according to principles of the invention for automated conversion of a visual presentation into digital data format.

As shown in FIG. 1, an exemplary system according to principles of the invention for automated conversion of a visual presentation into digital data format includes video cameras 11 and 13, a microphone 12, an optional lap top computer 10, and a digital field producer unit 14, also referred to herein as DFP unit or DFP computer. One of the video cameras 13 covers the speaker and provides video information to the live video section 1, and the other video camera 11 covers the slide show, flip chart, white board, etc. and provides the corresponding video information to the still video section 3. The microphone provides the audio to the sound section 2. In the example DFP unit of FIG. 1, the live video is encoded 4 (e.g., in MPEG) in real time during the speaker's visual presentation, and the still video of the slide show etc. is converted 5 into JPEG files in real time during the presentation.

A synchronizing section 16 of FIG. 1 operates automatically during the speaker's presentation to synchronize the still video information from the slide show, flip chart etc. with the live video information from the speaker. Both the live video and the still video can then be streamed live through a server 15 to multiple individual users via a data network 18 such as, for example, the Internet, a LAN, or a data network including a wireless link.

Alternatively, the live video and still video can be stored in storage unit 17 (e.g. hard disk), for a later replay broadcast via the server 15 and data network 18. Also, the information in the storage unit 17 can be transferred to portable storage media 9 such as floppy disks or CDS, for local replay by individual users later. The stored information can also be sent to a viewer as an e-mail.

A graphical user interface GUI 8 permits a user to control operations of the FIG. 1 system using a monitor 6 and input apparatus 7 (e.g., a keyboard, mouse, touch screen, etc.) suitably coupled to the GUI 8.

The encoding 4, converting 5 and synchronizing portions 16 of FIG. 1, and the GUI 8, can be implemented using one (or more) suitably programmed data processor(s), as will be evident from the following description.

Figure 2:
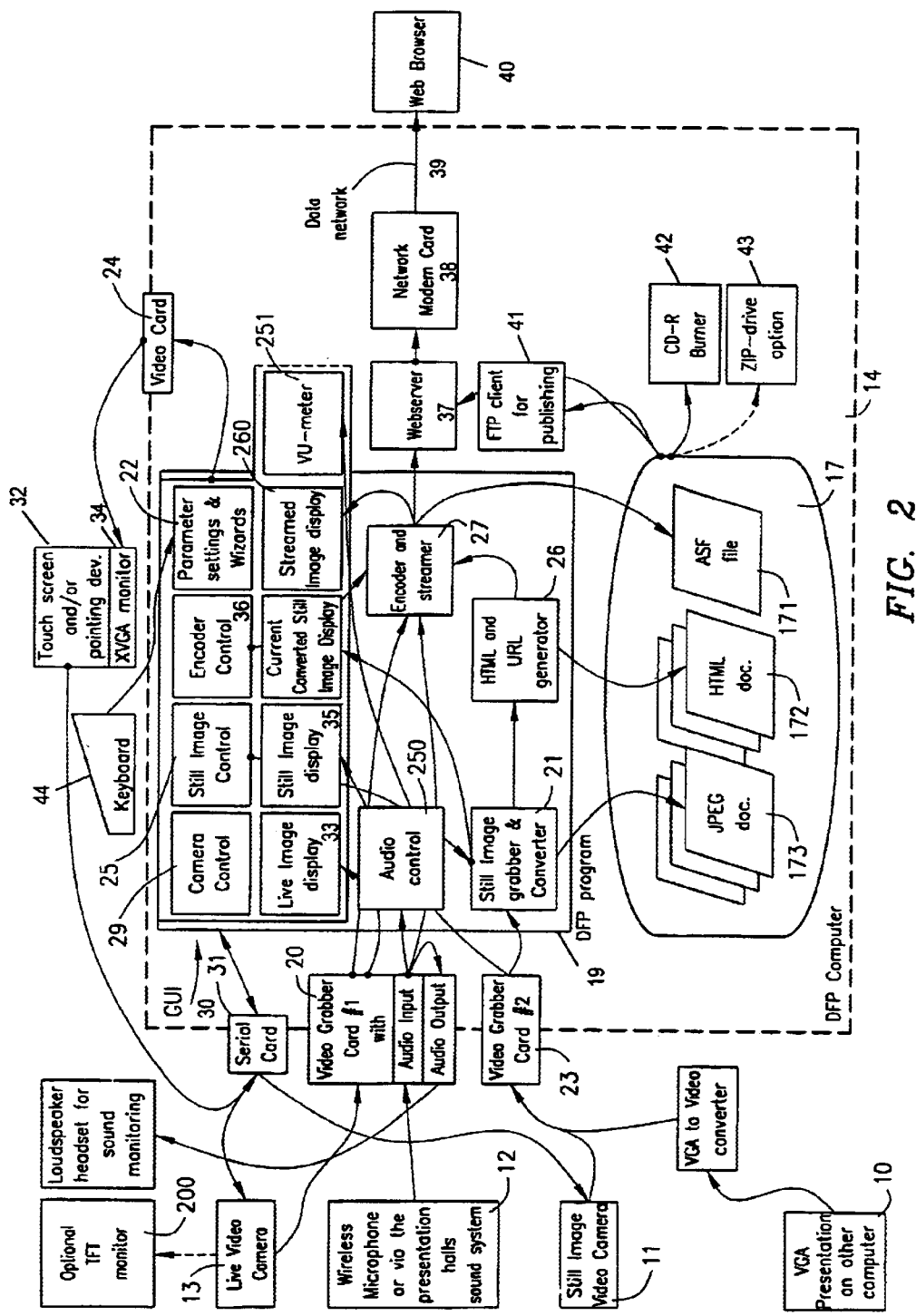
FIG. 2 diagrammatically illustrates an exemplary embodiment of the system of FIG. 1.

FIG. 2 is a detailed block diagram of an exemplary embodiment of the system of FIG. 1. A video grabber card 23 receives as an input a video signal from the still image camera 11, and converts this video signal into digital video data which is in turn output to the still image grabber and converter 21. Similarly, a video grabber card 20 receives as input a video signal from the live video camera 13, and produces therefrom corresponding digital video data which is in turn output to the encoder and streamer 27. The video grabber card 23 also includes a port for receiving VGA data output from the laptop computer 10. Video grabber cards such as 20 and 23 are well known in the art.

The audio input and audio output sections can be realized, for example, by a conventional audio card such as a SOUNDBLASTER PCI card. The audio input section receives as input an audio signal from the microphone 12, and outputs a corresponding audio signal to the encoder and streamer 27. The audio output section also receives the audio signal output from the audio input section, and provides this signal to speaker, for example, an audio headset, so an operator can monitor the recorded sound quality.

The graphical user interface GUI 30 includes a camera control section 29 that permits a user to control the cameras 11 and 13 via a conventional serial card 31. The serial card 31 also couples a user command input device 32, for example a touch screen as shown in FIG. 2, to the graphical user interface GUI 30.

The digital video data output from video grabber card 20 is also input to a live image display portion 33 of the graphical interface GUI 30. The live image display portion 33 of the GUI 30 causes the direct digital video data obtained from the live image camera 13 to be displayed to a user on a monitor 34 such as the flat XVGA monitor illustrated in FIG. 2. A conventional video card 24 coupled between the GUI 30 and the monitor can suitably interface the digital video data from the live image display section 33 to the monitor 34.

The GUI 30 also includes a still image display portion 35 coupled to the output of video grabber card 23 in order to receive therefrom the digital video data associated with the still video camera 11. The still image display section 35 of the GUI 30 uses the video card 24 to cause the digital video data associated with still image camera 11 to be displayed to the user via the monitor 34.

A DFP application section 19 (e.g., a software application running on the DFP computer 14) includes a still image grabber and converter portion 21 which receives as input the digital still video data from video grabber card 23, and produces therefrom, as an output, image data files 173 such as JPEG or GIF files. Taking JPEG files as an example output, each JPEG file produced by the still image grabber and converter portion 21 represents a freezing of the digital video data received from video grabber card 23 in order to produce at a desired point in time a still image associated with the video being recorded by the still video camera 11. The GUI 30 includes a still image control section 25 having an output coupled to the still image grabber and converter 21. The still image control portion 25 applies an appropriate control signal to the still image grabber and converter 21 when the still image grabber and converter 21 is to "grab" (capture) the next still image and create the corresponding JPEG file. The serial card 31 connecting the user command input (e.g., the touch screen) to the GUI 30 permits a user to access the still image control section 25, and thereby control the still image "grabbing" operation of the still image grabber and converter 21.

The DFP application section 19 further includes an encoder and streamer module 27 which receives the digital video output from video grabber card 20, and continuously encodes and compresses this data into a digitally transferrable stream with low bandwidth. The corresponding audio information from the audio input section is also encoded and compressed into the digitally transferrable stream. The encoding process is also conventionally referred to as streaming or streaming video. Encoding modules such as shown at 27 are conventionally known in the art. One example is the NetShow encoder and streamer conventionally available from Microsoft. In one example, the video encoding can be done in MPEG. The encoder and streamer module 27 can assemble the encoded video data in a document file, for example an ASF file.

The ASF file can be output from the encoder and streamer module 27 for live streaming out of the DFP unit 14, and also for storage at 171 in the storage unit 17. The encoder and streamer module 27 also encodes the digitized audio signal received from the audio input section. The encoded video information is also output from the encoder and streamer module 27 to a streamed image display portion 260 of the GUI 30, whereby the streaming video can be displayed on the monitor 34 via the video card 24. The encoder and streamer module 27 receives a control input from an encoder control portion 36 of the GUI 30. The encoder control portion 36 permits a user, via the user command input and serial card 31, to control starting and stopping of the encoding process. In addition, the encoder control 36 provides a recording counter which tracks the passage of time during the encoding of the video event.

The still image control section 25 in the GUI 30 of FIG. 2 controls the still image grabber and converter 21, which receives an input from video grabber card 23. Video grabber card 23 interfaces with the still image camera 11 which is used to record the slide show, flip chart etc. The still image grabber and converter 21 can create, for example, JPEG files as an output.

The still image control 25 can be automated according to principles of the invention to cause the still image grabber and converter 21 to periodically create a JPEG image of the still video source, give the JPEG image file a unique name based on the current system time, and store the file at 173. One example file name is hhmmss.jpg where hh is the current hour, mm is the current minute and ss is the current second. Along with the creation of the JPEG file, a corresponding wrapping HTML (Hyper Text Markup Language) file is created by an HTML & URL generator 26 and stored at 172 in the data storage unit 17. In one example, the HTML file can be created by copying a template from a template directory, and inserting the aforementioned file name hhmmss in a name field of the template.

The HTML file name, hhmmss.htm, is then sent as a relative URL (Uniform Resource Locator) from generator 26 to the encoder and streamer 27 for inclusion, at time stamp hhmnmss, in the encoded streaming video data (e.g., in an ASF file) output by the encoder and streamer 27. This synchronizes the still video information from the slide show with the "live" video information from the speaker. In addition, other files can be synchronized to the "live" video, such as sound, VRML, JAVA script, text files, voice-to-text files and files containing translations of voice-to-text files into other languages.

Conventional encoder and streamer products, such as the aforementioned NetShow product, provide functionality for passing URLs to the encoder for inclusion in the encoded streaming video data output. For example, the "SendScript" function in NetShow provides this functionality. SendScript can insert the URL into the ASF file if the URL is provided in the form of a Script Command Object, which can be easily done by workers in this art. The NetShow encoder can then insert the Script Command Object (i.e., the URL) at the desired time stamp, hhmmss.

Figure 3:
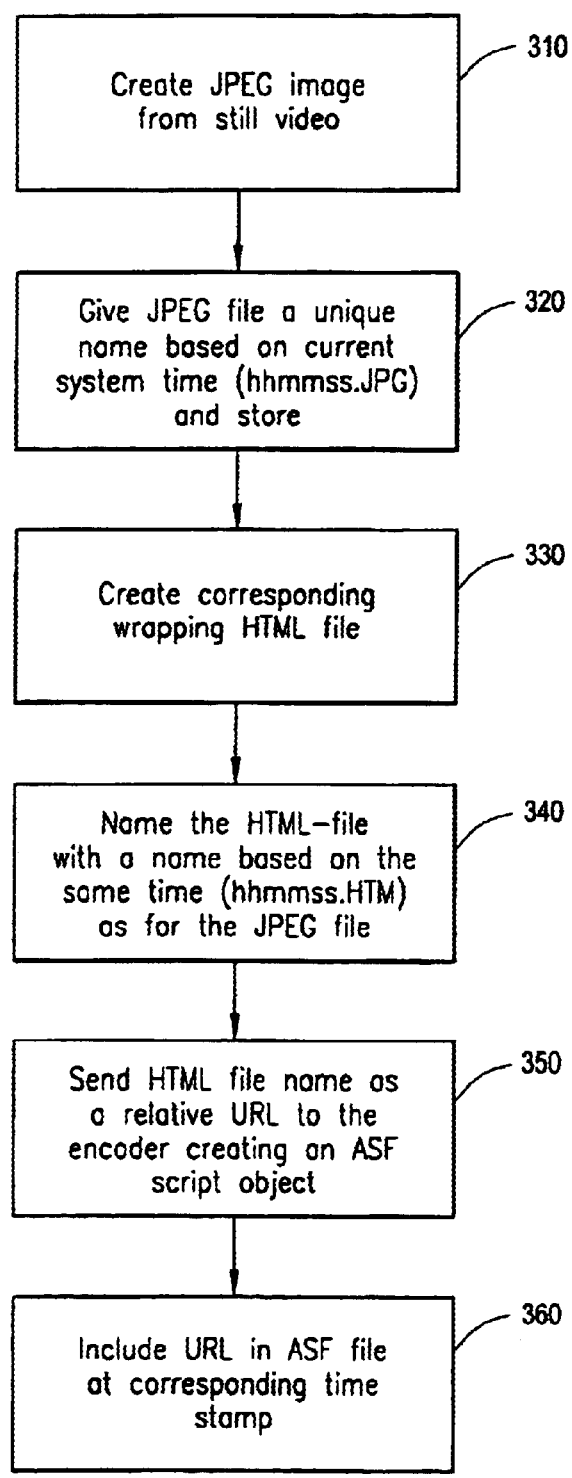
FIG. 3 illustrates in flow diagram format exemplary operations of the synchronizing section of FIG. 1.

FIG. 3 illustrates the above-described exemplary operations which can be performed, for example, by the components 21, 26 and 27 of FIG. 2 to implement the synchronizing function 16 illustrated diagrammatically in FIG. 1. At 310, the still image grabber and converter 21 creates a JPEG image file from a still video picture that has been grabbed from the still image camera. At 320, the JPEG file is given a unique name (e.g., hhmmss.jpg) based on the system time at which the picture was grabbed, (available, for example, from the recording counter in the encoder control portion of GUI), and the JPEG file is stored. At 330, the HTML & URL generator 26 uses the received JPEG file to create a corresponding wrapping HTML file. At 340, the generator 26 names the HTML file (e.g., hhmmss.htm) based on the system time at which the picture was grabbed, which can be provided by grabber/converter 21 to generator 26 along with the JPEG file. At 350, the generator 26 sends the HTML file name to the encoder 27 as a relative URL. At 360, the encoder and streamer 27 receives the URL, and includes the URL in its output ASF file at the time stamp corresponding to the system time on which the HTML file name was based.

In the example of FIG. 2, the streaming video output (e.g., an ASF file) provided by the encoder and streamer 27 is input to a web server 37, which can forward the streaming video output to a desired destination (e.g., a viewer's web browser 40) via a suitable data network 39, thereby providing a live broadcast of the event. The web server 37 can also add the appropriate server name and directory name to the relative URL (which typically does not include such information). The web server 37 also is coupled to the storage section 17, for example, via an FTP client for publishing 41, to receive the JPEG documents, HTML documents and ASF files stored therein. In addition, the storage section 17 may be coupled to a CD-R burner 42 or to a zip drive 43 for external storage.

The web server 37 is coupled to a network card 38 that gives the web server 37 access to a data network 39, for example a local area network (LAN) or the Internet. In one embodiment, the network card 38 can be an Ethernet network (PCI) card, which can handle TCP/IP and UUCP traffic in conventional fashion.

In another embodiment, a modem can be utilized by the web server 37 to access the data network.

FIG. 2 illustrates a web browser 40 coupled to the web server 37 via the data network 39 and the network card 38. Examples of suitable web browsers include conventional Netscape and Internet Explorer browsers. During a live video streaming broadcast, a viewer can connect to the web server 37 via the world wide web by typing a URL into the viewer's web browser (note that the web browser could also be provided as part of the DFP unit itself). The live video stream is distributed over the web, with the "live" video synchronized to the still images from the still image camera. Both the live video stream and the still video image can be shown on the same web page.

After an event (for example a seminar) has been recorded, a viewer can replay the video recording by performing a similar web connection as in the above-described live broadcast case. A URL is typed into the viewer's web browser, which connects the viewer to the web server 37 in the DFP computer. The web server 37 will then stream out the recorded video information the same as it would be streamed during the live streaming broadcast. The still video images are synchronized as in the live case, and they change in the output video stream at the same relative time as they did during the actual event. The viewer can decide when to start (or restart) the video stream in order to view the event as desired, and can navigate to a particular part of the recorded event, for example, by using a slider control provided by the web browser.

A viewer also has the option of viewing the event locally from a disk or CD-ROM. All that is needed to view an event recorded on disk or CD-ROM is a web browser with a conventional video streaming plug-in such as supported by Internet Explorer.

The web browser 40 preferably includes an ASF player, executing as a plug-in or an ActiveX control, that processes the ASF file and presents the audio/video to the viewer. When the player, for example a conventional multimedia player such as Microsoft Windows Media Player, encounters a Script Command Object in the ASF file, it interprets and executes Script Command Object. When the player identifies the Script Command Object as a URL, it passes the URL to the browser. The browser executes the URL as if it had been embedded inside an HTML document. According to one embodiment, the URL points to HTML document hhmmss.htm, which in turn contains a pointer to the corresponding JPEG document hhmmss.jpg.

If the Windows Media Player control is embedded in an HTML file that uses frames, the URL can be launched in a frame that is also specified by the Script Command Object. This allows the Windows Media Player control to continue rendering the multimedia stream in one frame, while the browser renders still images or Web pages in another frame. If the Script Command Object does not specify a frame, then the URL can be launched in a default frame.

Figure 4:
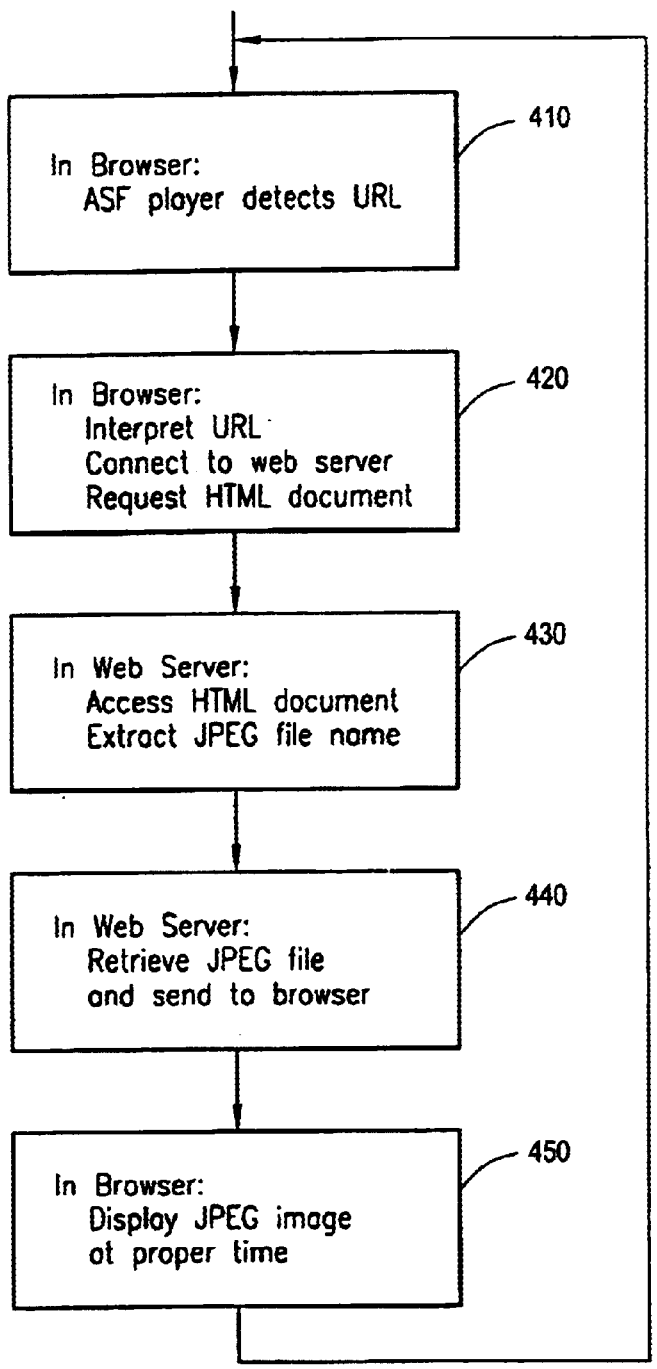
FIG. 4 illustrates in flow diagram format exemplary operations of the broadcast server of FIG. 1 or the web server of FIG. 2.

FIG. 4 illustrates exemplary operations of the web browser and web server of FIG. 2. The operations of FIG. 4 are advantageously executed during the web browser's processing of the ASF file. When a URL is detected (for example in the form of a Script Command Object) at 410 by the ASF player, the web browser at 420 interprets the URL for server destination and protocol to use (e.g., HTTP), connects to the web server and sends the web server a request for the HTML document. At 430, the web server accesses the HTML document from storage 172 and extracts therefrom the JPEG file name. At 440, the web server retrieves the JPEG file from storage 173 and sends it to the browser. At 450, the browser displays the JPEG image at the appropriate time with respect to the video streaming presentation.

During replay broadcasts, the web server retrieves and forwards the stored ASF file (containing the encoded/compressed "live" video data) from storage at 171, and also accesses the stored HTML documents, and retrieves and forwards the stored JPEG documents, generally as described above with respect to live streaming operation. The web browser receives the ASF file and JPEG documents, and synchronously integrates the "still" video images into the "live" video stream using generally the same procedure discussed above with respect to live streaming operation.

Figure 5:
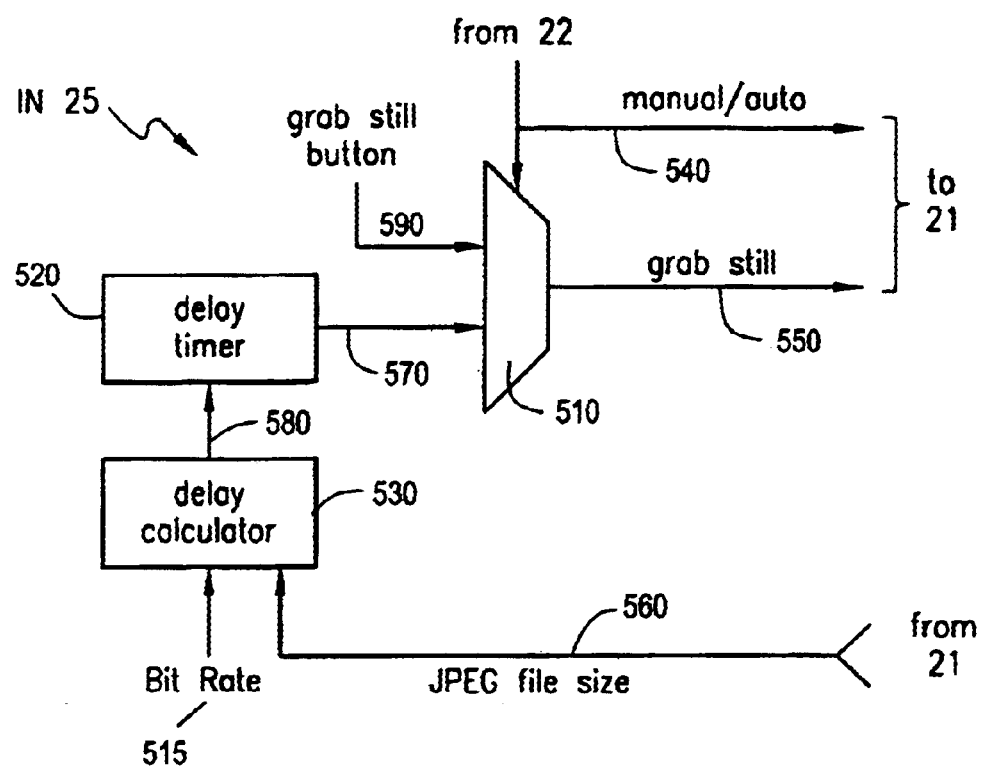
FIG. 5 illustrates pertinent portions of an exemplary embodiment of the still image controller of FIG. 2.

As mentioned above, still image control portion 25 of the GUI 30 can, either in response to user input or automatically, direct the still image grabber and converter portion 21 to grab a still image and convert it into JPEG format. FIG. 5 illustrates pertinent portions of an exemplary embodiment of the still image controller 25. The exemplary arrangement of FIG. 5 permits the still image grabber and converter 21 (see FIG. 2) to be controlled either by user input (i.e., manually) or automatically. A selector 510 receives a user (manual) input from a grab still button 590 which is provided in the user command input portion 32 (e.g., the touch screen) and can be actuated by a user whenever the user desires to grab a still picture from the still image camera. The selector 510 has another input connected to an output 570 of a delay timer 520. The selector 510 is controlled by a manual/automatic signal which can be preset from the user command input into the settings & wizards section 22 of the GUI 30. When the manual/automatic signal indicates manual operation, the selector 510 connects the grab still button input to its output 550, and when the manual/automatic signal indicates automatic operation, the selector 510 connects the output 570 of timer 520 to selector output 550. The selector output 550 is coupled to the still image grabber and converter 21, and provides thereto a grab still signal. The manual/automatic signal is also coupled at 540 to the still image grabber and converter 21.

A delay calculator 530 calculates a delay value which is preloaded at 580 from the delay calculator 530 into the timer 520. The delay calculator 530 calculates the desired delay value as a function of the bit rate 515 used in the live video streaming operation and the size of the JPEG file created by the still image grabber and converter 21 in response to the grab still signal at 550. The JPEG file size information from the still image grabber and converter 21 is provided at 560 to the delay calculator 530.

Figure 6:
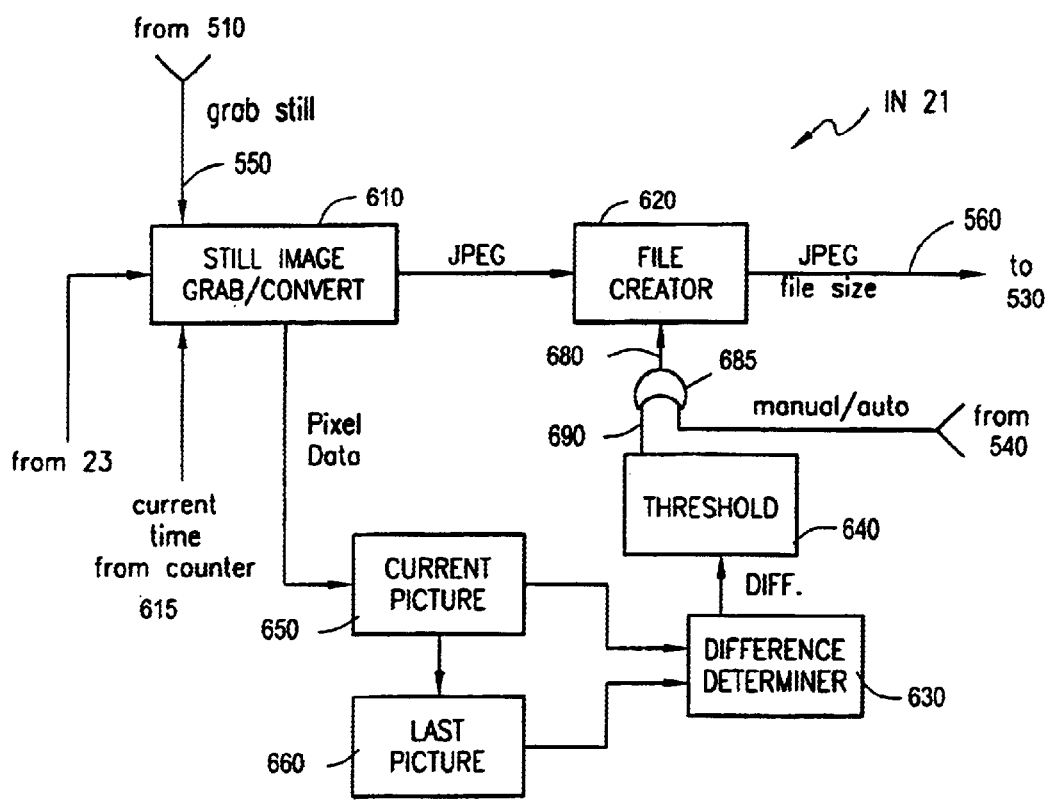
FIG. 6 illustrates pertinent portions of an exemplary embodiment of the still image grabber and converter of FIG. 2.

FIG. 6 illustrates pertinent portions of an exemplary embodiment of the still image grabber and converter 21 of FIG. 2, particularly those portions which interface with the exemplary still image controller embodiment of FIG. 5. A still image grab/convert portion 610 receives the output of video grabber card 23 and, responsive to activation of the grab still signal from the still image controller, grabs a picture, converts it into JPEG format, and notes the current time (e.g., from the counter in the encoder control portion of GUI). A file creator portion 620 receives the JPEG data and current time information (indicative of the time that the picture was grabbed) from the still image grab/convert portion 610, and creates a JPEG file in response to a create file input 680. When the file creator portion 620 creates a JPEG file, it outputs the file size information to the delay calculator 530 of FIG. 5.

The still image grab/convert portion 610 provides the pixel data received from the video grabber card 23 to a data storage section at 650 and 660. Each time a still image is grabbed, the pixel data is provided to a current picture storage section 650 whose previous contents are then loaded into a last picture storage section 660. In this manner, the pixel data associated with the current still image and the most recently grabbed previous still image (i.e., the last still image) are respectively stored in the data storage sections 650 and 660. A difference determiner receives the current and last picture data from the storage sections 650 and 660, and determines a difference measure, if any, between the current still image and the last still image. If the difference determiner determines that a difference exists between the two still images, then information indicative of this difference is provided to a threshold portion 640, which compares the difference to a threshold value to determine whether the images differ enough to warrant creation of a new JPEG file corresponding to the current image. If the difference information received from difference determiner 630 exceeds the threshold of threshold portion 640, then the output 690 of threshold portion 640 is activated, whereby the create file signal 680 is activated by operation of an OR gate 685 that receives the threshold output 690 as an input. The OR gate 685 also receives as an input the manual/automatic signal from FIG. 5, whereby the file creator 620 can be directed to create a JPEG file either by activation of the threshold portion output 690 or by a "manual" indication from the manual/automatic signal.

Figure 7:
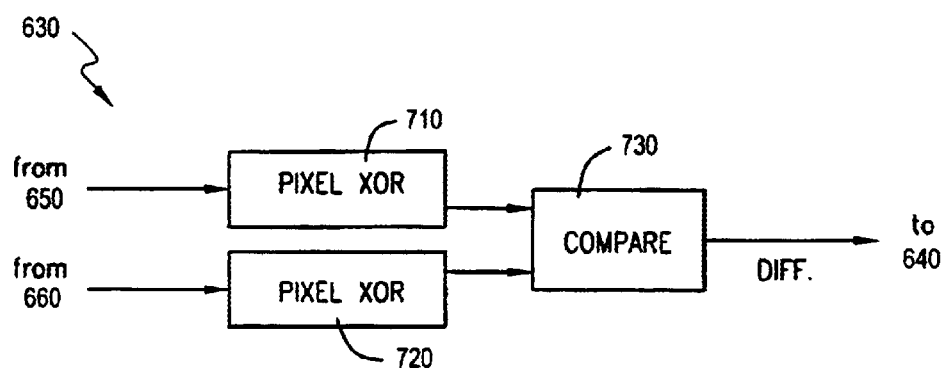
FIG. 7 illustrates an exemplary embodiment of the difference determiner of FIG. 6.

FIG. 7 illustrates one exemplary embodiment of the difference determiner 63 of FIG. 6. In the example of FIG. 7, the pixel data corresponding to the current image is applied to a first exclusive OR circuit 710 and the pixel data corresponding to the last image is applied to a second exclusive-OR circuit 720. Each exclusive-OR circuit exclusive-ORs all of the received pixels together. The outputs of the exclusive-OR circuits 710 and 720 are input to a compare circuit 730 which compares the two exclusive-OR outputs. The difference measure output from the compare circuit 730 can then be applied to the threshold portion 640 of FIG. 6.

Figure 8:
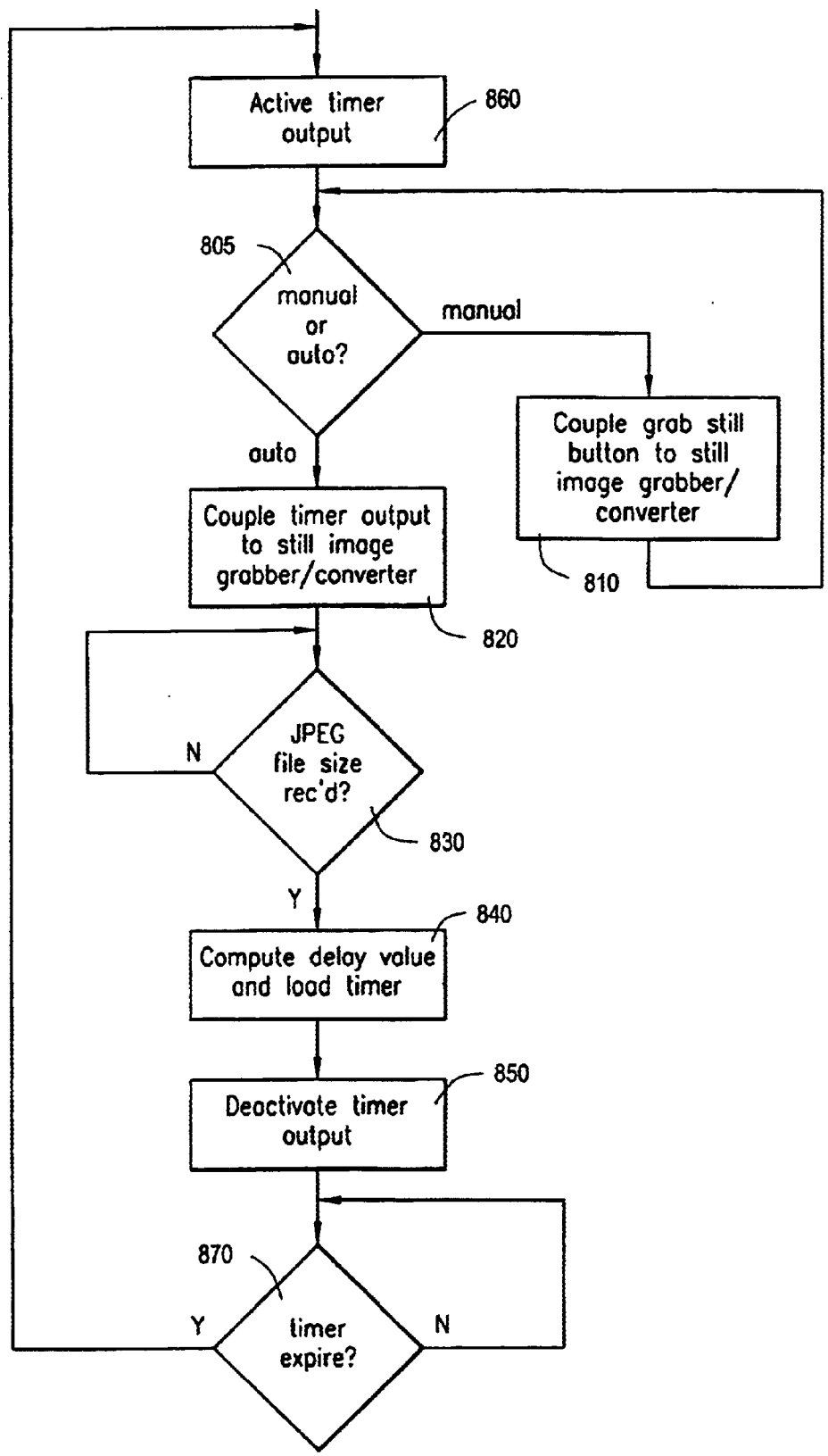
FIG. 8 illustrates exemplary operations which can be performed by the exemplary still image controller embodiment of FIG. 5.
Figure 9:
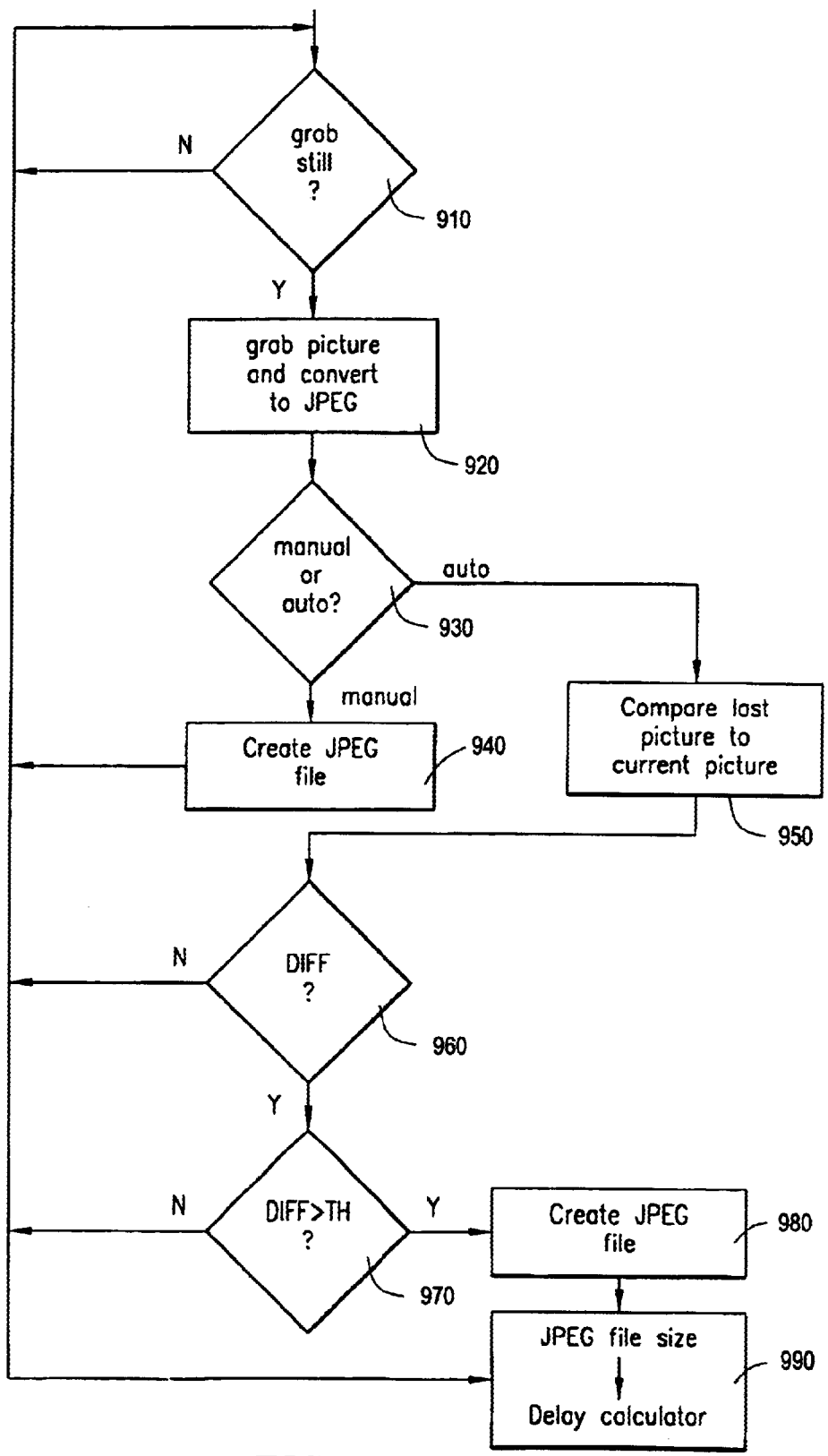
FIG. 9 illustrates exemplary operations which can performed by the exemplary still image grabber and converter embodiment of FIG. 6.

FIG. 8 illustrates exemplary operations of the exemplary still image controller arrangement of FIG. 5, and FIG. 9 illustrates exemplary operations of the still image grabber and converter arrangement illustrated in FIGS. 6 and 7.

Referring first to FIG. 8, the output of the delay timer 520 is activated at 860, and it is thereafter determined at 805 whether the manual/automatic signal indicates manual or automatic operation. If manual operation is indicated, then at 810 the selector 510 of FIG. 5 couples the grab still button to the grab still input of the still image grabber and converter 21, thereby enabling manual control of the grab still function. If automatic operation is indicated at 805, then at 820 the selector 510 couples the output of delay timer 520 to the grab still input of the still image grabber and converter 21, thereby enabling automatic control of the grab still function. At 830, the delay calculator 530 awaits JPEG file size information from the still image grabber and converter. When the JPEG file size information has been received at 830, the delay calculator at 840 computes a delay value, for example, by dividing the JPEG file size by the streaming video bit rate, and loads the computed delay value into the timer.

In response to being loaded with the delay value, the timer de-activates its output at 850, and the timer output remains de-activated until the timer expires at 870, whereupon the timer activates its output again at 860. Thereafter, the above-described procedures can be repeated.

FIG. 9 illustrates exemplary operations of the still image grabber and converter arrangement of FIG. 6. It is first determined at 910 whether the grab still input of still image grab/convert portion 610 is activated. When the grab still signal is activated, a picture is grabbed and converted into JPEG format at 920. At 930, if the manual/automatic signal indicates "manual" operation, then the file creator portion 620 creates a JPEG file at 940. Thereafter the grab still signal is again monitored at 910.

If the manual/automatic signal indicates "automatic" operation at 930, then at 950 the difference determiner 630 compares the last image to the current image. If the last image does not differ from the current image at 960, then the grab still signal is monitored at 910. If the images differ at 960, then the difference measure is compared to a threshold value TH at 970. If the difference measure does not exceed the threshold value at 970, then the grab still signal is monitored at 910. If the difference measure exceeds the threshold at 970, then the file creator portion 620 creates a JPEG file at 980.

After the JPEG file has been created at 980, information indicative of the size of the JPEG file is provided at 990 to the delay calculator 530 of FIG. 5. Thereafter, the grab still signal is monitored at 910.

Considering FIGS. 5, 6, 8 and 9 together, it can be seen that, whenever a new JPEG file is created (see 980 of FIG. 9), the JPEG file size information is provided to the delay calculator 530 (see 990 of FIG. 9 and 830 of FIG. 8). The delay calculator computes the delay value and loads it into the delay timer 520 (see 840 of FIG. 8), in response to which the delay timer 520 deactivates its output until the delay time has expired (see 850–870 of FIG. 8). This ensures that automatic activation of the grab still signal 550 does not occur so often that the viewer's facilities are overloaded with JPEG pictures.

It should be noted that the DFP computer of FIGS. 1 and 2 can be located remotely from the cameras/microphone and/or the touch screen monitor, and linked to the remote component(s) by a suitable conventional communication link which can include, for example, a wireless communication link.

Conventional compression algorithms (like MPEG) used in video streaming are typically based on the fact that not everything in a video picture has changed, and such algorithms therefore try to transmit only changes in the picture. This can be readily done if the camera position changes very little. However, in a live visual presentation, changes in camera position are typically quite desirable because, if the camera position is not substantially changed during the entire visual presentation, it may not be possible to capture all visible events, and the production may look very dull afterwards. Accordingly, embodiments of the present invention also utilize camera presets to simplify the video encoding when changes in camera position occur.

When the encoder 27 of FIG. 2 is operating, the user can select a preset camera position using the camera control section 29, and the serial card 31 (for example RS-232), which controls the camera to move toward the desired position. However, rather than processing all video information taken in by the camera during movement to the desired position, the system of FIG. 2 accesses, from the settings and wizards block 22, predetermined video information which represents the visual appearance expected to be presented to the video camera when the video camera reaches the preset position. Thus, embodiments of the present invention eliminate the need for processing a large amount of video information while the camera is moving to the desired position.

Figure 10:
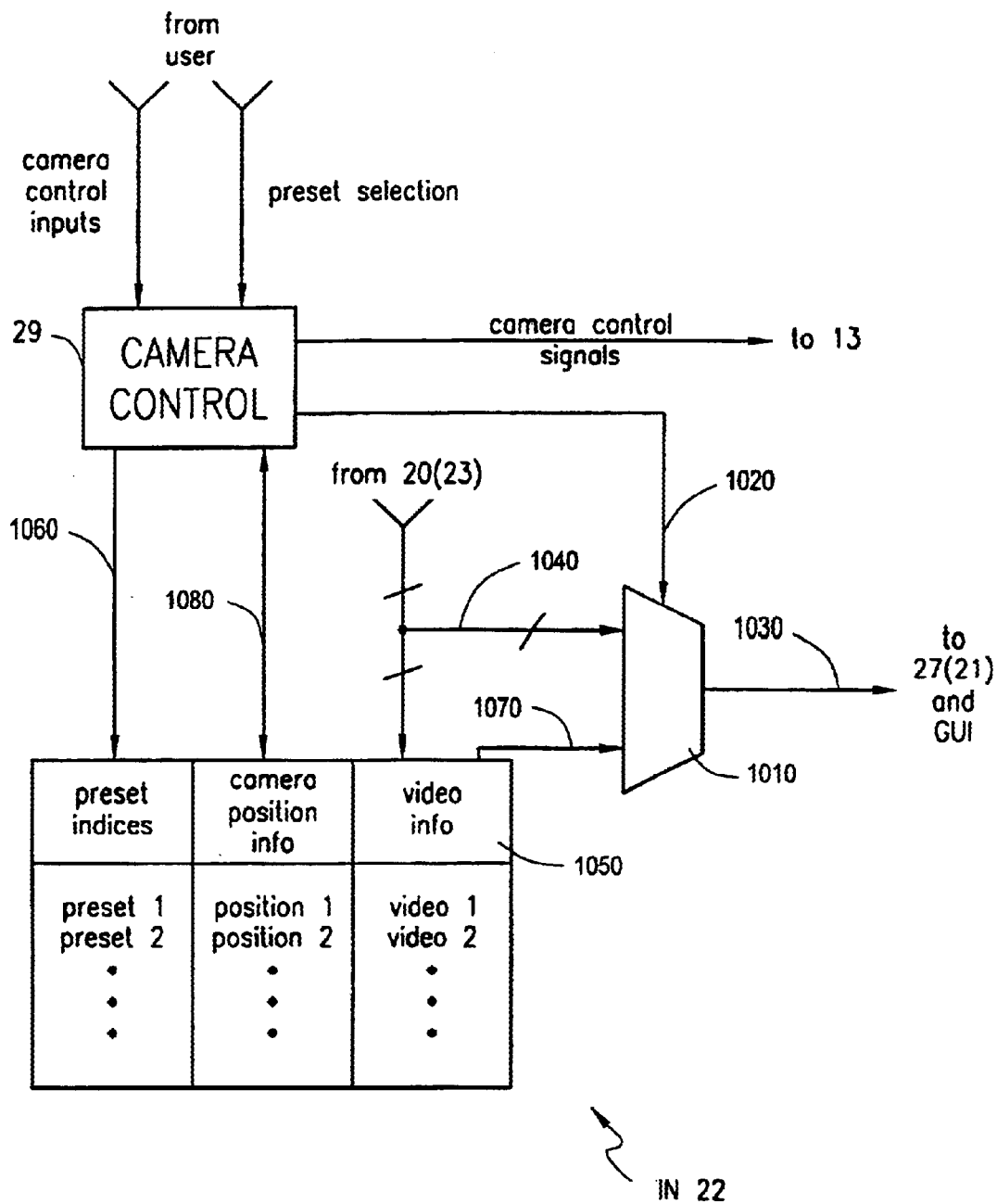
FIG. 10 illustrates an arrangement for implementing camera preset control techniques according to principles of the invention.

FIG. 10 illustrates an exemplary implementation of the above-described use of predetermined video information corresponding to preset camera positions. In FIG. 10, the camera controller 29 (see FIG. 2) receives from the user command input a preset selection command to move the live video camera to a preset position. At 1060, the camera controller 29 applies preset information from the preset selection command to a data storage portion 1050 in the settings and wizards section 22 of the GUI 30. In the data storage portion 1050, the various preset camera positions and corresponding video information are indexed against various preset indices, one of which is received from the user in each preset selection command. For example, the camera position information, position1, and the video information, video1, correspond to the preset index, preset1. The camera position information may also advantageously include other preset camera control information, for example, brightness, contrast, etc.

In response to the preset index received at 1060 from camera controller 29, the data storage section 1050 outputs (at 1080) the corresponding camera position information to the camera controller 29, and also outputs (at 1070) the corresponding video information to an input of a selector 1010 whose other input is coupled (at 1040) to receive video information from the video grabber card 20 (or 23).

In response to receiving the camera position information from the data storage section 1050, the camera controller 29 can output a control signal at 1020 to cause the selector 1010 to couple the video information at 1070 from data storage section 1050 to an output 1030 of selector 1010, which output 1030 is coupled to the encoder 27 (or still image grabber and converter 21). Also in response to receiving the camera position information from data storage section 1050, the camera controller 29 outputs suitable camera control signals to move the selected camera to the desired preset position. When the camera reaches the preset position, camera controller 29 can use control signal 1020 to couple selector input 1040 to selector output 1030.

To account for multiple possible input video sources, such as camera 11 and computer 10 available via video grabber card 23, and camera 13 available via video grabber card 20, the preset selection command provided by the user can indicate a selected input video source. This selected input information can then be applied to the data storage portion 1050 as part of the preset information, so that presets associated with the selected input source can be accessed.

Figure 11:
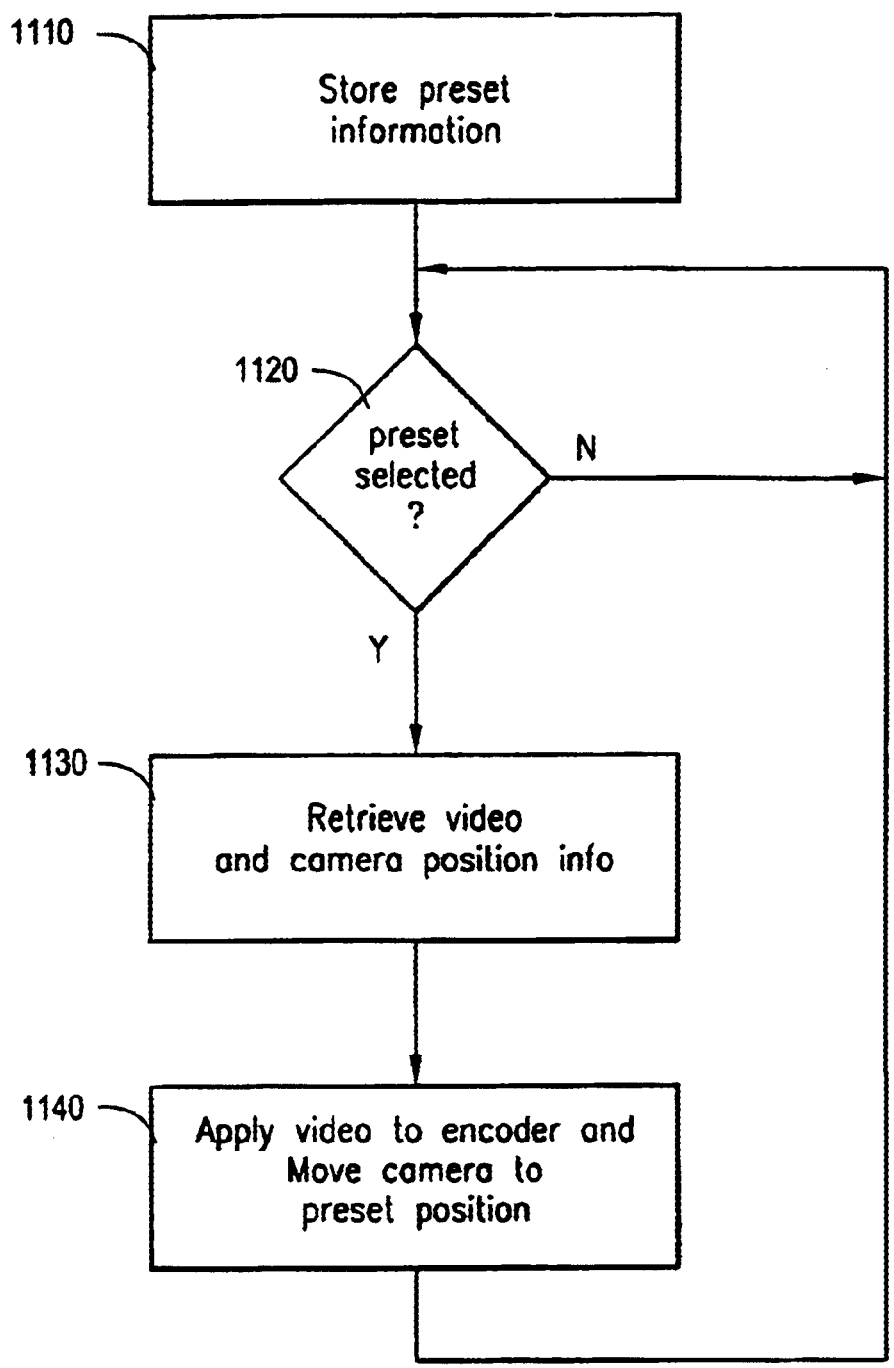
FIG. 11 illustrates exemplary operations which can be performed by the arrangement of FIG. 10.

FIG. 11 illustrates exemplary operations of the arrangement of FIG. 10. At 1110, the user stores the desired camera preset information, including the preset indices (e.g., preset1, preset2, etc.) and the corresponding camera position and video information, using the user command input and the monitor. When the selected camera has been moved, via camera control 29, to the desired position (as interactively visually monitored by the user), the preset index and corresponding camera position information (from camera control 29) and video information (from the video card 20) are stored in the data storage section 1050. An example procedure for establishing and storing camera presets is described in more detail below relative to the graphical user interface GUI.

After the preset indices, camera position information and video information have been stored at 1110, the camera controller 29 awaits at 1120 a preset selection command from the user. When a preset command is received at 1120, the corresponding video information and camera position information is retrieved at 1130. At 1140, the video information is applied to the encoder, and the camera controller 29 outputs appropriate control signals to move the live camera to the desired preset position. Thereafter, the next preset selection command is awaited at 1120.

Figure 13:
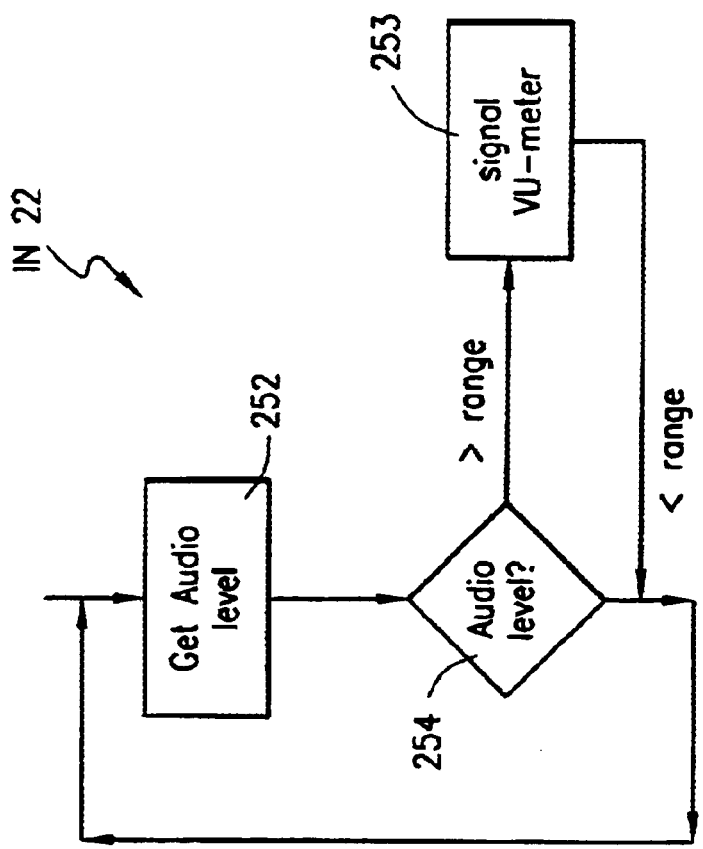
FIG. 13 illustrates exemplary operations performed by the exemplary audio control for feeding the exemplary audio level graph display and handling of activation of input source.
Figure 14:
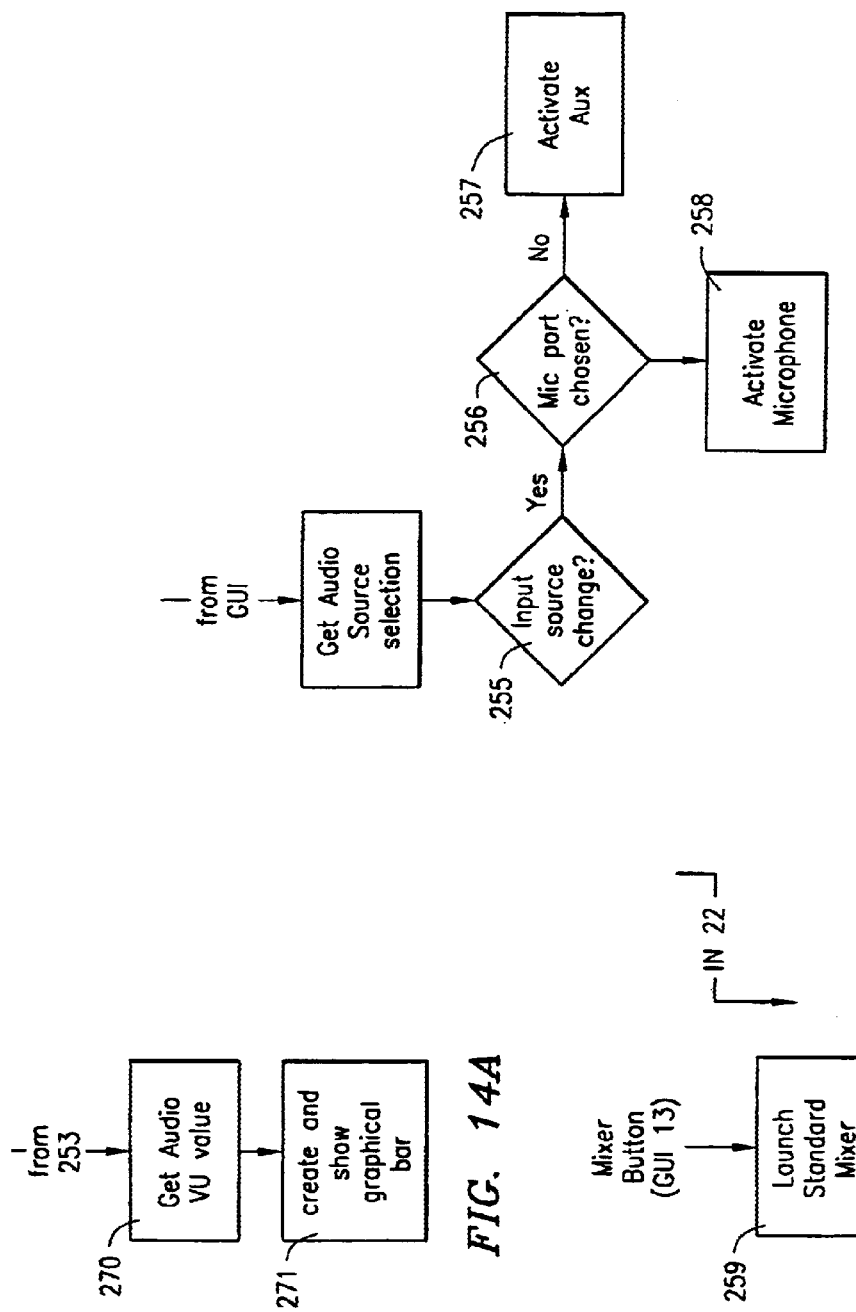
FIGS. 14A–14C illustrate exemplary operations performed by the exemplary audio level graph display handling the GUI for audio level feedback and activation/launching of the standard mixer system installed in the operating system.
Figure 15:
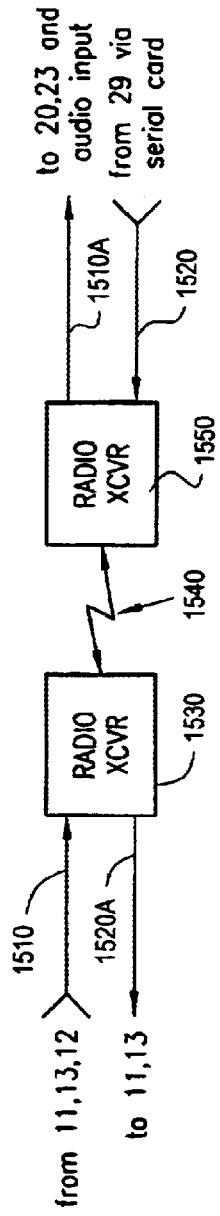
FIG. 15 illustrates diagrammatically an exemplary modification of the system of FIG. 2.
Figure 16:
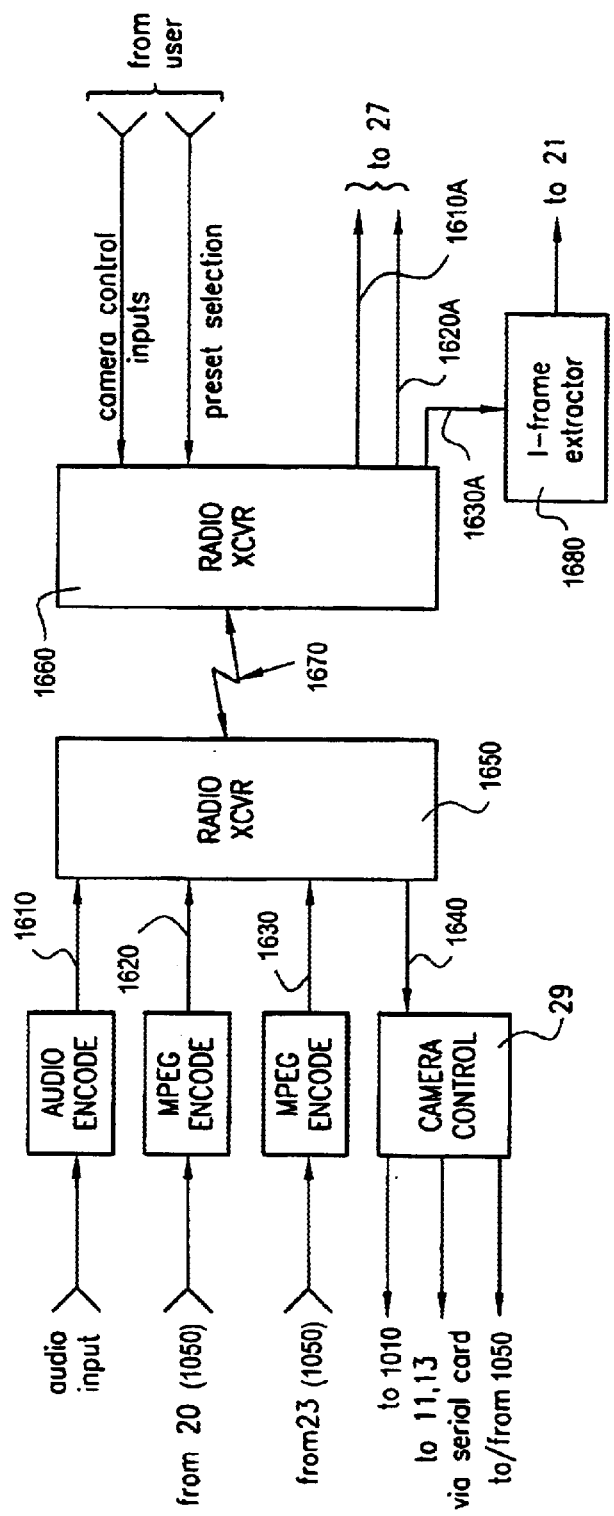
FIG. 16 illustrates diagrammatically a further exemplary modification of the system of FIG. 2.
Figure 17:
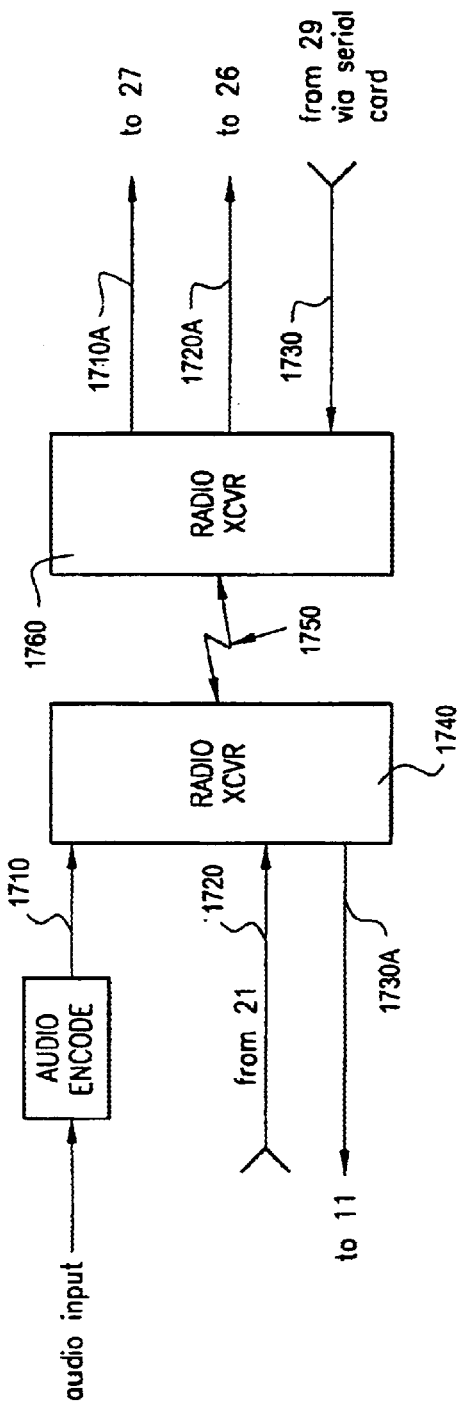
FIG. 17 illustrates diagrammatically a further exemplary modification of the system of FIG. 2.
Figure 18:
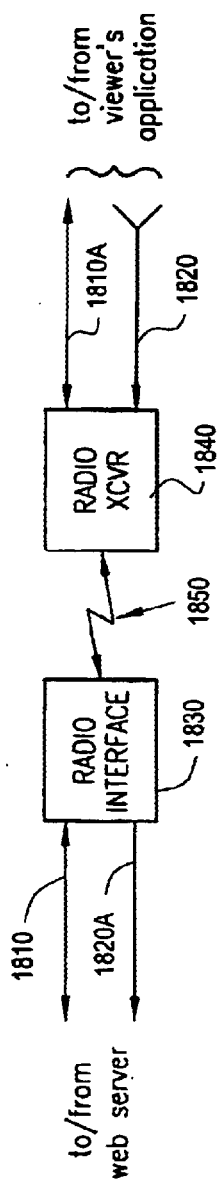
FIG. 18 illustrates diagrammatically a further exemplary modification of the system of FIG. 2.

FIG. 13 illustrates how the audio control 250 of FIG. 2 monitors the audio VU level and triggers signals to the graphical display of a VU meter 251 shown in FIG. 2. The audio level is compared against a range-parameter (252 and 254) and a signal is generated when a change is discovered (253). Referring also to FIGS. 14A–14C, the graphical display computes the amount of blocks to display and changes the colors of the blocks that exceed a certain limit (see 270 and 271 in FIG. 14A). This kind of display is quite common on audio devices like stereo players, etc. and should be well known and understood by any user. The user has the possibility to access a standard system mixer from the GUI (see 259 in FIG. 14B) in order to reduce or raise the volume, etc. FIG. 14C shows at 255–258 how a user can select and change the input audio source via the GUI.

Figure 12:
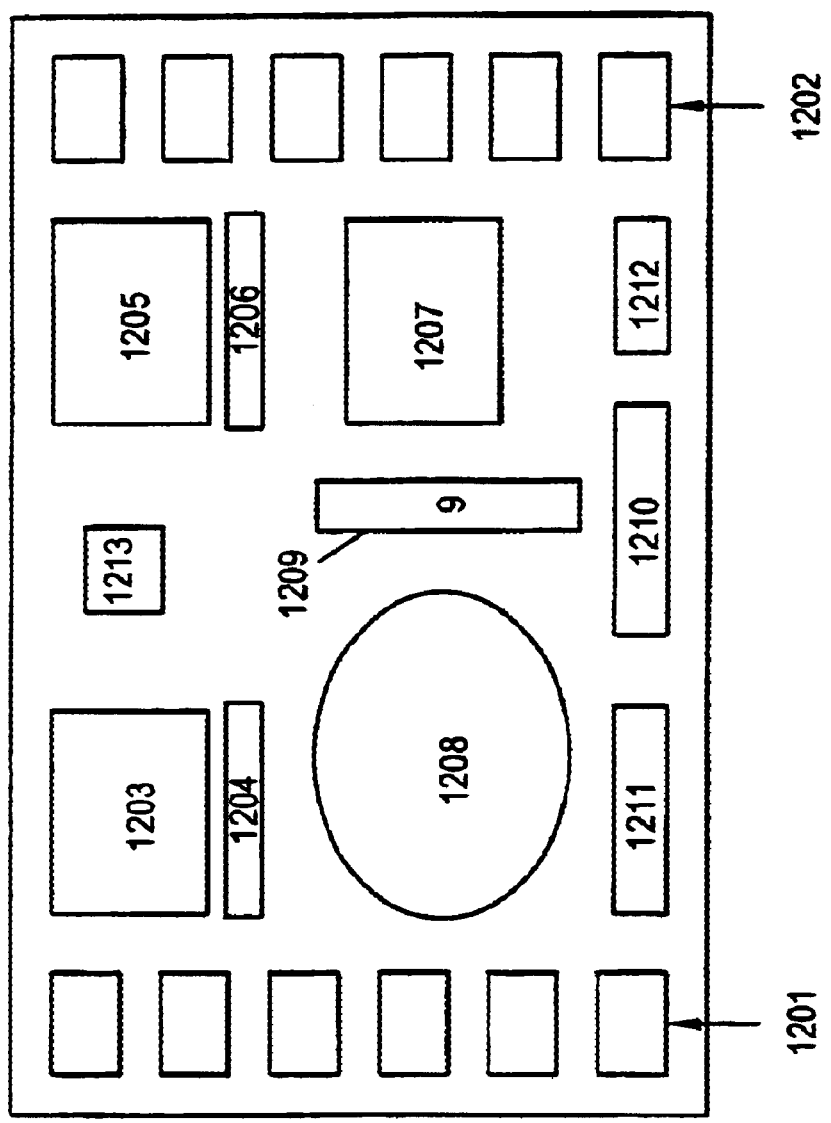
FIG. 12 illustrates one example of an interactive visual display provided by a graphical user interface according to principles of the invention.

FIG. 12 illustrates how the graphical user interface GUI can be used in combination with, for example, a touch screen (or a display/mouse combination) to control various aspects of the process of recording an event such as a seminar. FIG. 12 shows outlines of various images presented to the user via the touch screen or other display, which images correspond to various control functions provided by the GUI. Thus, the exemplary control operations described below can be performed by a user via the touch screen (or a display/mouse combination) and the GUI.

In the process of presetting the cameras, a camera control switch 1210 is first used to activate either the live video camera 13 or the still video camera 11. Camera translation control at 1208 and camera zoom control at 1209 can then be touched (or clicked) as desired to aim and zoom the activated camera. The view that results from the aiming and zooming of the activated camera can be observed at either the preview portion 1203 (for the live camera) or the preview portion 1205 (for the still camera). When the resulting view is satisfactory, the corresponding camera position can be chosen as a preset camera position, by pressing either button 1211 (for the live camera) or button 1212 (for the still camera).

The views corresponding to six different camera presets can be displayed at 1201 (live camera presets), and 1202 (still camera presets). Any of the presets can be selected for the corresponding camera by pressing the desired view at 1201 or 1202. The desired audio level can be set using the sound control button 1213.

The video streaming process can be started by pressing a start button provided in an encoder control portion 1204. The streamed image can be displayed at 1203. Encoder control portion 1204 also provides a running counter/clock which indicates to the user the amount of time that has elapsed during the encoding session.

A picture from the still image camera can be grabbed by pressing the grab still button 1206. The latest picture grabbed from the still image camera is displayed at 1207.

Because the preview portion 1203 associated with the live camera 13 is not capable of displaying both the actual live image from the camera and the streamed image output from the encoder 27 (the streamed image being delayed several seconds behind the actual live image), an external monitor 200 (see FIG. 2) is provided so that a view of the actual live image from camera 13 is available at all times.

It will be evident to workers in the art that the DFP computer embodiments described above can be implemented using a suitable PC or other desktop computer workstation, for example, a Wintel-based 300 MHZ double processor PC.

It will be evident to workers in the art that the above-described features of embodiments of the present invention greatly simplify the process of converting a visual presentation into digital format for transmission through a data network. Anyone, not just experts, can use a system according to principles of the invention to create, for example, a low cost Internet multimedia production.

Although exemplary embodiments of the present invention are described above in detail, this does not limit the scope of the invention, which can be practiced in a variety of embodiments.

What is claimed is:

1. A method of converting a visual presentation into a digital format, comprising:

monitoring a first sequence of first visible events in the visual presentation, and also monitoring a second sequence of second visible events in the visual presentation, wherein timewise corresponding relationships exist between at least some of the first visible events and at least some of the second visible events;

while the first and second sequences are occurring, producing in response to the first and second sequences first and second digital signals that respectively represent the first and second sequences but are not indicative of said timewise corresponding relationships;

while the first and second sequences are occurring, processing current portions of the first and second digital signals while successive portions of the first and second digital signals are concurrently being produced in response to the first and second sequences, said processing step including automatically producing digital data indicative of said timewise corresponding relationships;

wherein said processing step includes capturing portions of the second digital signal and converting each of said captured portions into a corresponding still image data format, said still image data-formatted portions representing respective parts of the second sequence, and wherein said automatically producing step includes assigning to each still image data-formatted portion a time reference indicative of a time at which the corresponding portion of the second digital signal was captured; and wherein said processing step further includes encoding the first digital signal to produce an encoded data stream, said assigning step including assigning said time references relative to elapsed time in said encoded data stream, and the method further including inserting into the encoded data stream, at respective points in time corresponding to the time references, information indicative of the respective still image data-formatted portions corresponding to the time references.

2. The method of claim 1, wherein said step of inserting information includes inserting into the encoded data stream, at the respective points in time, Uniform Resource Locators (URLs) which respectively correspond to the still image data-formatted portions.

3. The method of claim 2, wherein said encoding step includes producing from the first digital signal an Active Streaming Format (ASF) file, and wherein said step of inserting URLs includes inserting the URLs in the ASF file.

4. A method of converting a visual presentation into a digit format, comprising:

monitoring a first sequence of first visible events in the visual presentation, and also monitoring a second sequence of second visible events in the visual presentation, wherein timewise corresponding relationships exist between at least some of the first visible events and at least some of the second visible events;

while the first and second sequences are occurring, producing in response to the first and second sequences first and second digital signals that respectively represent the first and second sequences but are not indicative of said timewise corresponding relationships;

while the first and second sequences are occurring, processing current portions of the first and second digital signals while successive portions of the first and second digital signals are concurrently being produced in response to the first and second sequences, said processing step including automatically producing digital data indicative of said timewise corresponding relationships;

wherein said processing step includes capturing portions of me second digital signal and converting each of said captured portions into a corresponding still image data format, said still image data-formatted portions representing respective parts of the second sequence, and wherein said automatically producing step includes assigning to each still image data-formatted portion a time reference indicative of a time at which the corresponding portion of the second digital signal was captured;

wherein said processing step further includes selecting respective points in time at which to capture said portions of the second digital signal, and permitting said selecting step to be performed either automatically or manually;

wherein said step of converting into still image data-formatted portions includes creating digital data files corresponding to said captured portions; and wherein said selecting step includes selecting one said point in time automatically based on a file size of a digital data file corresponding to a previously captured portion of the second digital signal.

5. A method of converting a visual presentation into a digital format, comprising:

monitoring a first sequence of first visible events in the visual presentation, and also monitoring a second sequence of second visible events in the visual presentation, wherein timewise corresponding relationships exist between at least some of the first visible events and at least some of the second visible events;

while the first and second sequences are occurring, producing in response to the first and second sequences first and second digital signals that respectively represent the first and second sequences but are not indicative of said timewise corresponding relationships;

while the first and second sequences are occurring, processing current portions of the first and second digital signals while successive portions of the first and second digital signals are concurrently being produced in response to the first and second sequences, said processing step including automatically producing digital data indicative of said timewise corresponding relationships;

wherein said processing step includes capturing portions of the second digital signal and converting each of said captured portions into a corresponding still image data format, said still image data-formatted portions representing respective parts of the second sequence, and wherein said automatically producing step includes assigning to each still image data-formatted portion a time reference indicative of a time at which the corresponding portion of the second digital signal was captured;

wherein said processing step further includes selecting respective points in time at which to capture said portions of the second digital signal, and permitting said selecting step to be performed either automatically or manually; and wherein said step of converting into still image data-formatted portions includes creating digital data files corresponding to said captured portions, wherein said step of selecting points in time includes automatically separating, by a separation time, the points in time respectively associated with two consecutively captured portions of the second digital signal, said separating step including determining the separation time, said determining step including dividing a file size of a digital data file corresponding to an earlier captured one of the consecutively captured portions by a data rate used in said encoding step.

6. A method of converting a visual presentation into a digital format, comprising:

monitoring a first sequence of first visible events in the visual presentation, and also monitoring a second sequence of second visible events in the visual presentation, wherein timewise corresponding relationships exist between at least some of the first visible events and at least some of the second visible events;

while the first and second sequences are occurring, producing in response to the first and second sequences first and second digital signals that respectively represent the first and second sequences but are not indicative of said timewise corresponding relationships;

while the first and second sequences are occurring, processing current portions of the first and second digital signals while successive portions of the first and second digital signals are concurrently being produced in response to the first and second sequences, said processing step including automatically producing digital data indicative of said timewise corresponding relationships;

wherein said processing step includes capturing portions of the second digital signal and converting each of said captured portions into a corresponding still image data format, said still image data-formatted portions representing respective parts of the second sequence, and wherein said automatically producing step includes assigning to each still image data-formatted portion a time reference indicative of a time at which the corresponding portion of the second digital signal was captured; and wherein said processing step includes determining whether a currently captured portion of the second digital signal differs sufficiently from a previously captured portion of the second digital signal, and creating a digital data file corresponding to the currently captured portion only if a sufficient difference is determined.

7. An apparatus for synchronizing information that represents first and second synchronized sequences of visible events, comprising:

an input for receiving first and second digital signals which are produced in response to the first and second sequences and which respectively represent the first and second sequences but are not indicative of said synchronization of the first and second sequences;

a data processing unit coupled to said input for processing current portions of the first and second digital signals while successive portions of the first and second digital signals are concurrently being produced in response to the first and second sequences and received at said input, said data processing unit including a first data path for processing of said first digital signal and a second data path for processing of said second digital signal, and said data processing unit including a synchronizer coupled to one of said first and second data paths and operable concurrently with said processing of said current portions for automatically producing information indicative of said synchronization of the first and second sequences;

an output coupled to said data processing unit for outputting information representing the first and second sequences and the synchronized relationship therebetween; and wherein said first data path includes an encoder for receiving said first digital signal and producing therefrom an encoded data stream, wherein said second data path includes a converter for receiving said second digital signal and capturing portions of said second digital signal and converting each of said captured portions into a corresponding still image data format, and wherein said synchronizer is coupled between said encoder and said converter for synchronizing the still image data-formatted portions with the encoded data stream, wherein said synchronizer includes a timer that measures elapsed time during production of said encoded data stream by said encoder, said converter having an input coupled to said timer, said converter responsive to said timer for providing each of said still image data-formatted portions with a corresponding time reference relative to the encoded data stream produced by said encoder.

8. The apparatus of claim 7, wherein said synchronizer includes an input coupled to said converter for receiving from said converter information indicative of said corresponding relationships between said still image data-formatted portions and the respective time references, said synchronizer further including an output coupled to said encoder for providing to said encoder indications of said corresponding relationships.

9. The apparatus of claim 8, wherein said encoder is responsive to said indications from said synchronizer for inserting into said encoded data stream, at points in time corresponding to said time references, information indicative of the respective still image data-formatted portions corresponding to said time references.

* * * * *